United States Patent [19]
Dieffenderfer et al.

[11] Patent Number: 5,590,372
[45] Date of Patent: Dec. 31, 1996

[54] VME BUS TRANSFERRING SYSTEM BROADCASTING MODIFIERS TO MULTIPLE DEVICES AND THE MULTIPLE DEVICES SIMULTANEOUSLY RECEIVING DATA SYNCHRONOUSLY TO THE MODIFIERS WITHOUT ACKNOWLEDGING THE MODIFIERS

[75] Inventors: James N. Dieffenderfer, Endicott, N.Y.; Bruce J. Morehead, Santa Clara, Calif.

[73] Assignee: International Business Machines Corporation, Armonk, N.Y.

[21] Appl. No.: 913,270

[22] Filed: Jul. 14, 1992

[51] Int. Cl.$^6$ ................................................. G06F 12/02
[52] U.S. Cl. ........................... 395/823; 395/824; 395/829; 395/846
[58] Field of Search ........................... 395/200, 275, 395/823, 824, 829, 846; 335/200, 275, 425

[56] References Cited

U.S. PATENT DOCUMENTS

| | | | |
|---|---|---|---|
| 4,597,077 | 6/1986 | Nelson et al. | 370/88 |
| 4,665,518 | 5/1987 | Champlin et al. | 370/89 |
| 4,679,191 | 7/1987 | Nelson et al. | 370/84 |
| 4,868,866 | 9/1989 | Williams, Jr. | 380/49 |
| 4,956,772 | 9/1990 | Neches | 364/200 |
| 5,163,131 | 11/1992 | Row et al. | |
| 5,193,193 | 3/1993 | Iyer | 395/725 |
| 5,307,475 | 4/1994 | Lau | 395/425 |
| 5,313,594 | 5/1994 | Wakerly | 395/325 |
| 5,319,767 | 6/1994 | Lau | 394/425 |

OTHER PUBLICATIONS

Vranesic & Zeky, *Microcomputer Structures*, ©1989, pp. 569–573.

*Primary Examiner*—Thomas C. Lee
*Assistant Examiner*—Sang Hui Kim
*Attorney, Agent, or Firm*—Pryor A. Garnett; Arthur J. Samodovitz

[57] ABSTRACT

A method for synchronous broadcasting of multiple bytes over a VME bus broadcasts multiple bytes of data across the VME bus using hardware which interfaces between the bus and attached devices. An VME address modifier code is used to identify the type of broadcast and is sent by a master device, without requiring any response from the slave devices. In a first type of broadcast an address location is transmitted over the address bus and a data message is transmitted over the data bus. In a second type of broadcast data messages are transmitted over both the data and the address buses. Multiple broadcast cycles are used to transmit the desired amount of data. An address strobe qualifies the address and data buses for a message broadcast cycle and is used by the receiving slave to clock in the message.

16 Claims, 5 Drawing Sheets

FIRST METHOD

SECOND METHOD

FIG.1
*Prior Art*
ADDRESS BROADCAST

FIG.6
FIRST METHOD

FIG.2
RECEIVE MODULE

FIG.5 TRANSMIT MODULE DMA AND BUFFER CONTROL

FIG.3 RECEIVE MODULE DMA AND BUFFER CONTROL

FIG.4
TRANSMIT MODULE

FIG.7 SECOND METHOD

VME BUS TRANSFERRING SYSTEM BROADCASTING MODIFIERS TO MULTIPLE DEVICES AND THE MULTIPLE DEVICES SIMULTANEOUSLY RECEIVING DATA SYNCHRONOUSLY TO THE MODIFIERS WITHOUT ACKNOWLEDGING THE MODIFIERS

BACKGROUND OF THE INVENTION

1. Technical Field

This invention relates to interfaces, specifically to the additional hardware required to add a synchronous message broadcast cycle to a VME bus.

2. Description of the Prior Art

The VME bus is a widely accepted standardized bus for connecting a myriad of electronic products together. These products include processor cards, memory cards, and I/O cards. VME bus exchanges occur between a VME bus master and a VME bus slave. A bus member may at one time be able to function as a bus master and at another time function as a bus slave. There may be several bus masters and several bus slaves on a single VME bus.

However the VME bus architects did not provide a message broadcasting facility for the VME bus. The absence of this feature makes the controlling of an array of processes inefficient and precludes accurate synchronization of processes on different VME bus members.

A description of the VME bus is as follows. When a master bus member wishes to communicate to a bus slave, it first arbitrates for bus ownership. Once ownership of the bus is secured, the master places the slaves address on the address bus (which can be 16, 24 or 32 bits wide) and places the operation type on the address modifier bus. The master then asserts address strobe (AS), and places the data on the data bus which can be 8, 16 or 32 bits wide. The master proceeds to assert data strobe (DS), however, the bus cycle is not complete until the slave responds with a data acknowledgement signal (DTACK). This interlocking of the master's data strobe and the slave's DTACK classifies the VME bus as an asynchronous bus.

The VME address modifier bus (AM) is six bits wide and is driven by VME bus masters to tell the targeted slave the size of the address bus and the type of cycle. A VME slave is selected by the decode of the address bus and AM bus (i.e. even if a VME slave's address range is placed on the address bus it will not participate in the cycle if it does not support the accompanying AM code. The VME AM bus has several reserved codes and sixteen user defined codes. Using a user defined AM code to identify the message broadcast cycle ensures that existing VME slaves without the broadcast function will not participate.

Because the VME bus is an asynchronous bus, (interlocking tags, DS from master and DTACK from slave) a problem arises when communicating with multiple slaves, as to which slave returns DTACK indicating that the transfer is complete. Because DTACK is a single signal the master can not distinguish which or how many slaves are answering.

A device produced by Force Computers Inc. is believed to offer a single byte message broadcast addition to the VME bus. Multiple byte messages can be broadcast one byte at a time. This device's receiving hardware generates an interrupt to the local central processing unit (CPU) after each byte indicating that a message has been received. (The local CPU can examine the received message in an internal register). The hardware has two channels for receiving messages. The first channel has an eight byte queue for message storage. The second channel has a single byte register for message storage.

This device's message broadcast is limited to a single byte. Quite often in an array context a single byte is insufficient to control the array elements. Alternatively this device can also send messages in the conventional manner, individually addressing one slave at a time and transmitting a multi-byte message. The master can repeat this until all the slaves in the array have received the message. This method requires that the master re-arbitrate for the bus before sending the message to each slave, and since the time to transmit information is directly proportional to the number of elements (bus slaves) in the array, this time delay limits overall performance. Also, sending control information across the VME bus to one bus slave at a time in a sequential fashion precludes synchronization of the processes because the control information arrives at each bus slave at differing times. In addition, due to the asynchronous interlocking cycles the standard VME bus cycle is limited in speed because of the round trip time of the handshaking signals (data strobe and DTACK).

In order to control an array of processes and provide an accurate means of synchronization between tasks it is desirable for a bus master to communicate with more than one slave at a time. In the prior art devices, after asserting data strobe the bus master must wait for the bus slave to respond. If the bus master were to address multiple slaves at one time, the master would have to wait for all the addressed bus slaves to respond by nature of the interlock between data strobe and DTACK. Because the VME bus has only one DTACK signal it is not possible for the master to determine if all the addressed slaves are responding ready. In addition asynchronous communication with bus interlocks is inherently slow due to round trip propagation time of the interlocking tags.

Accordingly, various objects of this invention are to:

1) add a synchronous message broadcasting cycle to a VME bus;
2) provide a means for event synchronization;
3) provide the necessary hardware to allow for synchronous message broadcasting; and
4) introduce a message broadcasting cycle to the VME bus so as to promote downward compatibility.

SUMMARY OF THE INVENTION

According to this invention, the VME bus synchronously broadcasts multiple bytes of data from a device acting as the master to the devices attached to the bus and acting as slaves. An address modifier code is used to identify the type of cycle and is sent by the master, without requiring any response from the slaves. Embodiments of this invention consist of "transmit" and "receive" message broadcast hardware, and two alternative methods for using that hardware to broadcast multiple bytes over the VME bus.

In the first method the master places a storage address on the address bus, and this address is broadcast synchronously with a data message that is placed on the data bus. In the second method, a second packet of data bytes is placed on the address bus (instead of an address location as in the first method) and broadcast synchronously with the first packet of data bytes which was placed on the data bus, thereby doubling the broadcast message bandwidth. A user defined address modifier (AM) code of the VME bus is used to identify a message broadcast cycle as either one in which data is sent only over the data bus or one in which data is sent over both the address and data bus. Multiple broadcast cycles are used to transmit the desired amount of data.

This invention greatly increases the effective bandwidth of the VME bus. The synchronous nature of the invented message broadcast cycle eliminates the round trip time of the prior arts interlocking signals (data strobe and data acknowledge) providing an additional increase in performance. By employing a synchronous message broadcast cycle, this invention advantageously provides a means by which multiple byte messages can be transmitted efficiently.

Other features and advantages of this invention will become apparent from the following detailed description of the presently preferred embodiment of the invention, taken in conjunction with the accompanying drawings.

DESCRIPTION OF THE PREFERRED EMBODIMENT

Technical Background

Figure 1:
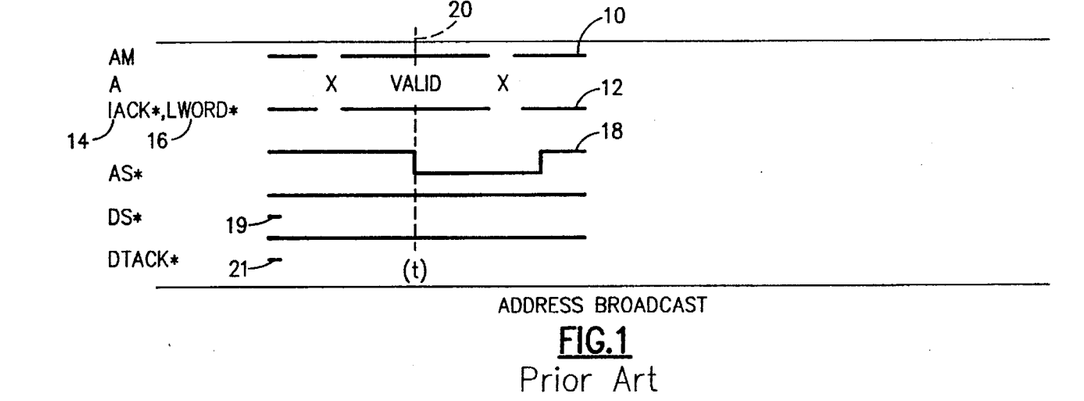
FIG. 1 is a timing diagram of a prior art address broadcast.

FIG. 1 is a timing diagram of a prior art address only broadcast cycle. Address modifier bus (AM) 10 carries the broadcast method code. Address bus (A) 12 carries the address location, and carries LWORD 16 which carries a word length signal. Address strobe line (AS) 18 signals a receiving device to read address bus 12, address modifier bus 10, and LWORD 16. Address modifier bus 10, address bus 12, and address strobe line 18 are all driven by the bus master, and are read by the receiving devices (slaves) when the address strobe line 18 is driven low. In FIG. 1 this occurs at time (t), signified by dashed line 20. No data is transferred during the VME address only cycle and therefore no data strobes (DS) 19 are asserted by the master and no slaves assert a data acknowledgement signal (DTACK) 21.

The VME architects allowed for an address only cycle to facilitate the design of a VME master's memory address decoder. The master's address can be passed to the VME bus and the cycle terminated before data strobes are asserted if the decode ends up to be local to the master. This allows for the VME master and slave address decoders to work in parallel.

Overview

An address strobe qualifies the address and data bus for a message broadcast cycle and is used by the receiving slaves to clock in the message.

To begin a message broadcast cycle the originating VME master arbitrates for VME bus mastership in the same way it does for standard data transfers. Once bus mastership is acquired the appropriate address modifier (AM) code is placed on the AM bus and the data making up the first packet of the message is placed on the data bus. The number of bytes in the packet is determined by the width of the data bus and the size of the bytes. Using the address bus to send message data (second method) doubles the message bandwidth by allowing data to be sent on both the data bus and the address bus. The message sequence length is limited by hardware constraints just as it would be when using only the data line, first method. After normal deskew time the address strobe is asserted to cause the slave devices to receive the message packet, and then deasserted and the next message packet is placed on the bus. This sequence continues until the master has no more message bytes to send. When the user-defined AM code is removed the broadcast cycle is complete.

Message buffering is provided for the receive hardware. One option is for the message buffer controls to have direct memory access (DMA) capability to the local store. In this case the local interface will program the VME interface's DMA address register with a local store starting address. This address will then be used to DMA the data from the message broadcast buffer into local store after the appropriate bus arbitration for the local interface. This first option is preferably used with the second method described below. Another option is for the receiving local interface to fetch the data directly from the message buffer. In this case, DMA capability between the message broadcast buffer and local store is not required. The local interface will read the message buffer and write to the local store starting at whatever address the local interface desires. A third option uses the address broadcast from the VME bus to address the receiving (slave) device's local store, and is preferred for use with the frist method discussed below.

Receive Module

Figure 2:
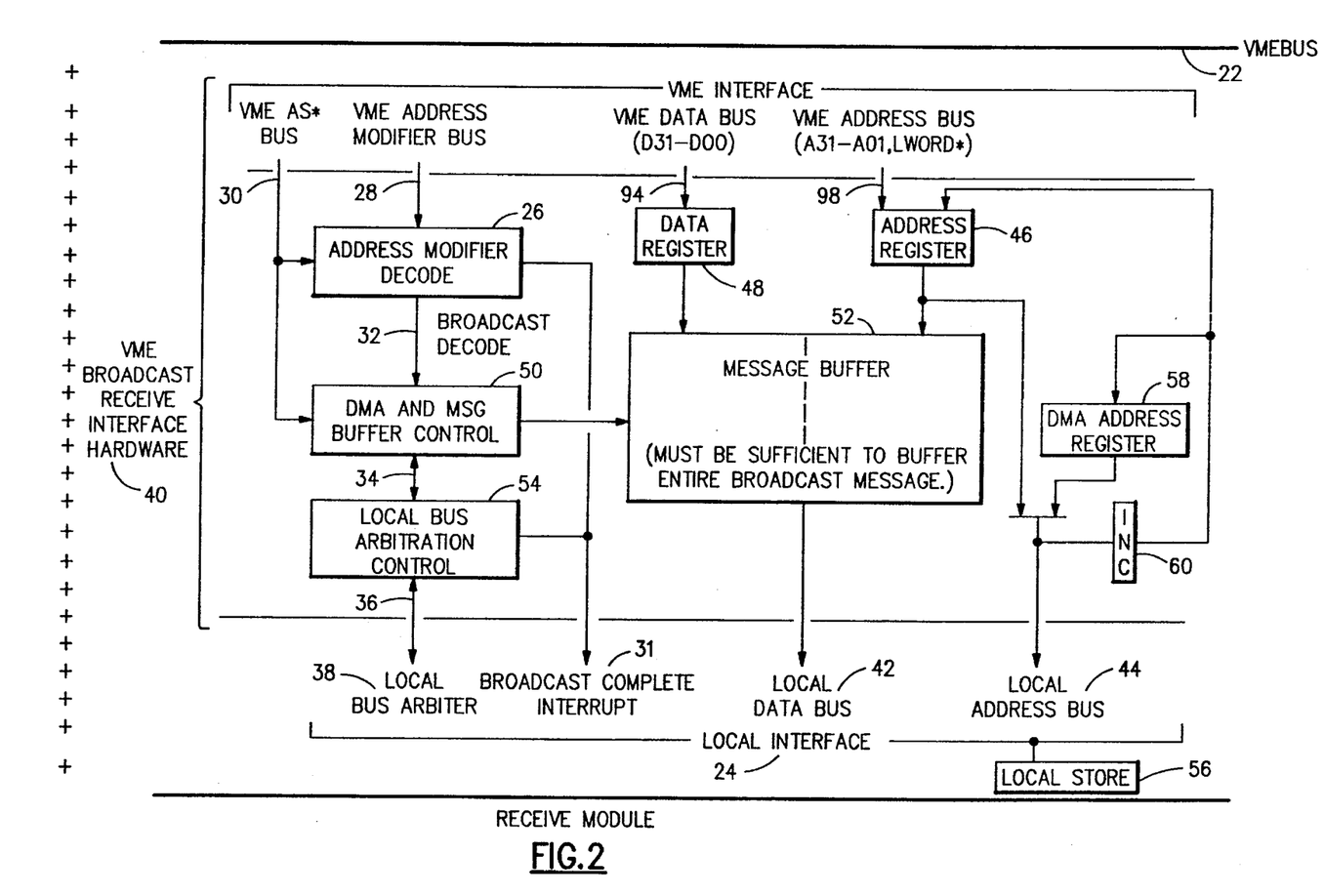
FIG. 2 is a block diagram of the receive hardware for a VME interface according to the invention.

FIG. 2 is a block diagram of the VME broadcast receive interface hardware for a VME interface according to the present invention. FIG. 2 is a fully buffered receive module. It should be noted that for a VME broadcast message receive, full buffering of the broadcast message is desirable in order to guarantee message acceptance at all bus units regardless of activity on the respective local buses.

In FIG. 2, a receive module comprises a VME bus 22 which interfaces a local interface 24 via a VME broadcast receive interface hardware 40. Interface hardware 40 comprises an address register 46, a data register 48, a message buffer 52, an address modifier decode logic unit 26, a direct memory access (DMA) and message buffer control 50, a local bus arbitration control 54, a direct memory access (DMA) address register 58, an incrementer 60, and a multiplexor 61.

Address register 46 is connected to VME address bus 98 via an input line, and is connected to local address bus 44 via an input line through incrementer 60. Address register 46 has output connections to both local address bus 44 through multiplexer (MUX) 61 and message buffer 52.

Data register 48 has an input connection extending from VME data bus 94 and has an output connection to message buffer 52. Address modifier decode logic unit (address modifier decode) 26 has input connections extending from both VME address modifier bus 28 and VME address strobe line 30. Address modifier decode 26 has an output connection extending to local interface 24 (carries broadcast complete interrupt signal 31), and has an output connection extending to DMA and message buffer control unit 50 (carries broadcast decode signal 32). DMA and MSG buffer control unit 50 has an input/output connection 34 with local bus arbitration control 54 which has an input/output connection 36 extending to and from a local bus arbiter 38. DMA and MSG buffer control unit 50 has an output connection extending to message buffer 52 which has an output connection extending to local data bus 42.

The VME broadcast receive interface hardware 40 of FIG. 2 interfaces VME bus 22 to local interface 24 to allow the local device to receive message broadcasts. The address modifier decode 26 contains logic which monitors VME address modifier bus 28 for an address modifier code indicating a message broadcast cycle. The AM codes are checked when address strobe line 30 is asserted. Assertion of address strobe line 30 signifies that there is valid information on lines 28, 94 and 98 for the slaves to read.

When address modifier decode 26 detects a message broadcast cycle it asserts a broadcast decode signal 32. Local bus arbitration control lines 34 and 36 may simply transmit two signals, BUS REQUEST and BUS GRANT. BUS REQUEST informs the local device (via local bus arbiter 38) that VME broadcast receive interface hardware (VME interface hardware) 40 desires mastership of local data bus 42 and local address bus 44. The BUS GRANT signal informs VME interface hardware 40 that it has been given local bus mastership.

The components of FIG. 2 described above operate in the same manner regardless of whether the broadcast method is data bus only (first method) or data bus plus address bus (second method). The components of FIG. 2 whose operation differ between the first and the second method are as follows.

For data bus-only message broadcasting (first method) the local store 56 address location to which a data message is to be written, is captured in address register 46 and the broadcast data to be written to local store 56 is captured in data register 48.

DMA and message buffer control 50 writes the captured data from data register 48 into message buffer 52. Once the data is received by message buffer 52, or simultaneously with the data's receipt, DMA and message buffer control 50 signals local bus arbitration control 54 that the message in message buffer 52 needs to be DMA'd across local data bus 42. Local bus arbitration control 54 requests local interface 24 (via a bus request signal to local bus arbiter 38) to grant mastership of local data bus 42 and local address bus 44 to VME interface hardware 40. Once local bus mastership is obtained by VME interface hardware 40, the address captured in address register 46 is written to local address bus 44 and the data from message buffer 52 is written to local data bus 42. The data is then written from local data bus 42 to local store 56 at the local store address specified by local address bus 44. When a message is successfully written into local store 56 the local bus arbitration control 54 sends a broadcast complete interrupt signal 31 to the local device. Alternatively, if VME interface hardware 40 does not support DMA into local store 56, address modifier decode 26 sends broadcast complete interrupt signal 31 to the local device when the message broadcast cycle is ended.

For data bus-plus-address bus broadcasts (the second method described below) broadcast data is captured in both data register 48 and address register 46. DMA and message buffer control 50 writes the captured data (from both buses) into message buffer 52. Once the data is received by message buffer 52, or simultaneously with the data's receipt, DMA and message buffer control 50 signals local bus arbitration control 54 that the messages in message buffer 52 need to be DMA'd across local data bus 42. Local bus arbitration control 54 requests local interface 24 (via a bus request signal to local bus arbiter 38) to grant mastership of local data bus 42 and local address bus 44 to VME interface hardware 40. Once local bus mastership is obtained by VME interface hardware 40 the messages are written into local store 56 by direct memory access address register (DMA ADD) 58 which the local device has loaded with the local store 56 address location to be written to. (The local device selects which local store 56 address will be gated onto local address bus 44). When a message is successfully written into local store 56 local bus arbitration control 54 sends a broadcast complete interrupt signal 31 to the local device. Alternatively, if VME interface hardware 40 does not support DMA into local store 56, address modifier decode 26 sends broadcast complete interrupt signal 31 to the local device when the message broadcast cycle is ended.

For first method broadcasts incrementer 60 is used to increment address register 46 each time data is written into local store 56. Similarly, for second method broadcasts, incrementer 60 is used to increment DMA ADD register 58 each time data is written into local store 56.

Figure 3:
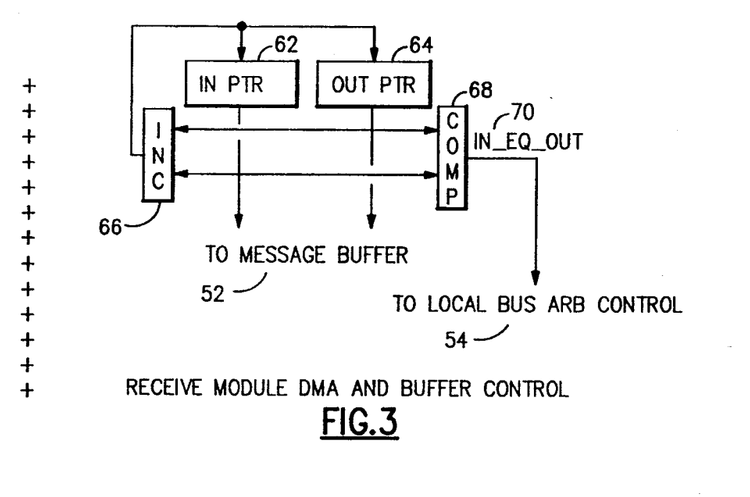
FIG. 3 is a detailed block diagram of the primary components of the direct memory access (DMA) and message buffer control of FIG. 2.

Receive Module's Direct Memory Access (DMA) and Message (MSG) Buffer Control FIG. 3 is a detailed block diagram of the primary components of the DMA and MSG Buffer Control 50 of FIG. 2.

Input register (IN PTR) 62 and output register (OUT PTR) 64 are used to address message buffer 52 of FIG. 2. IN PTR 62 and OUT PTR 64 share incrementer 66. At the start of a message broadcast receive both IN PTR 62 and OUT PTR 64 are cleared to zero. IN PTR 62 is incremented by incrementer 66 as the message data is written into message buffer 52. Once the data is being received by message buffer 52, or after the data has been totally received, local bus arbitration control 54 sends a bus mastership request (bus request) to local bus arbiter 38 (of FIG. 2). Once local bus arbiter 38 (of FIG. 2) sends a bus mastership grant signal (bus grant) to local bus arbitration control 54, OUT PTR 64 is used to read data messages from message buffer 52 to local data bus 42 (of FIG. 2). OUT PTR 64 is incremented by incrementer 66 as the message data is written onto local data bus 42 (of FIG. 2). Message buffer 52 is read until comparator 68 indicates that IN PTR 62 is equal to OUT PTR 64, via the assertion of IN PTR equals OUT PTR (IN EQ OUT) 70. The assertion of IN EQ OUT 70 informs local bus arbitration control 54 to send a broadcast complete interrupt signal to the local device (thereby relinquishing VME interface hardware 40's mastership of local data bus 42 and local address bus 44).

Transmit Module

Figure 4:
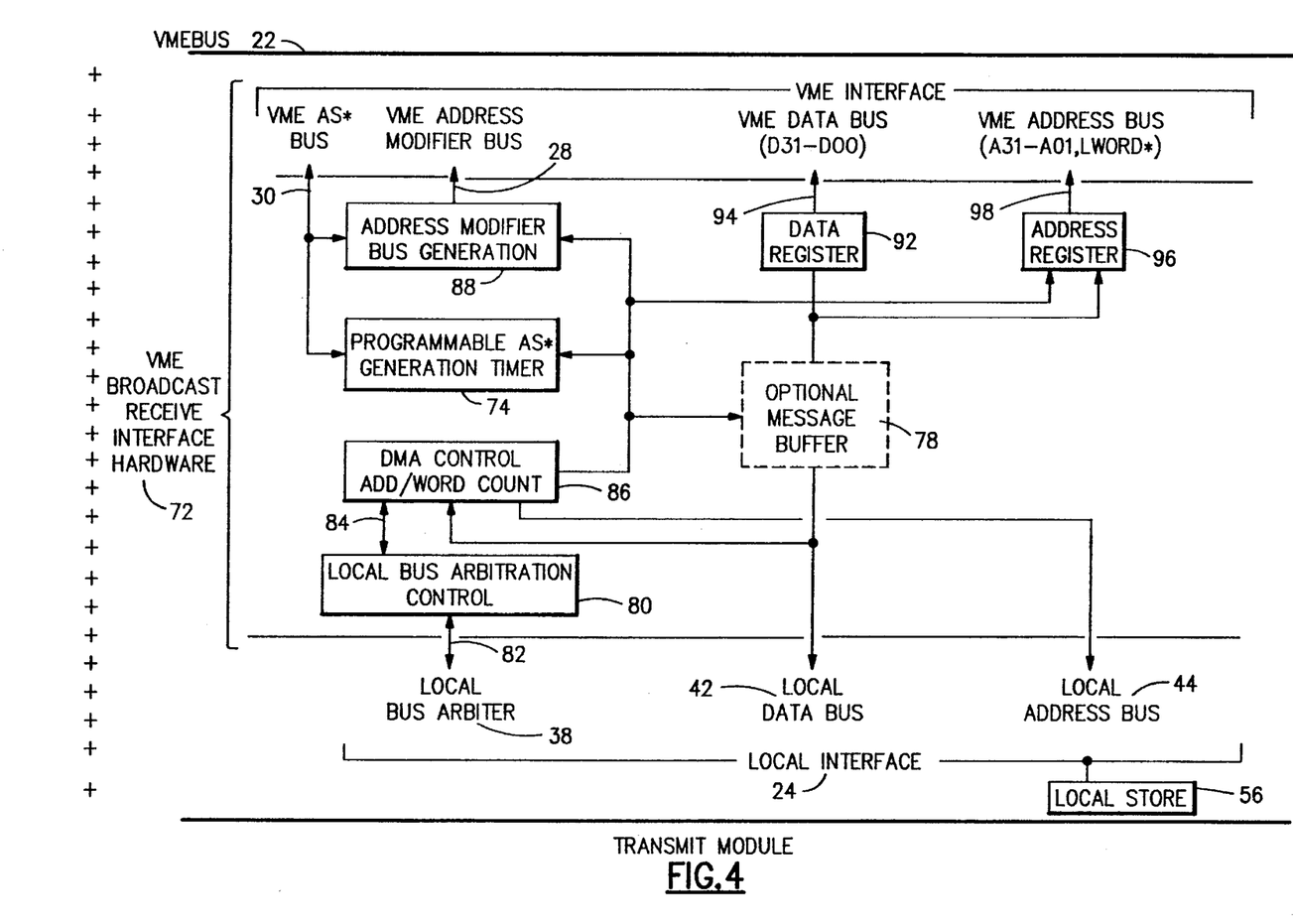
FIG. 4 is a block diagram of the transmit hardware for a VME interface according to the invention.

FIG. 4 is a block diagram of the broadcast transmit interface hardware for a VME interface according to the present invention. The transmit module comprises a VME bus 22 which interfaces with a local interface 24 via a VME broadcast transmit hardware (VME interface hardware) 72. VME interface hardware 72 comprises an address register 96, a data register 92, an optional message buffer 78, a VME address modifier bus generation 88, a programmable address strobe (AS) generation timer 74, a DMA control ADD/Word count 86, and a local bus arbitration control 80.

Local bus arbitration control 80 has an input/output connection with local bus arbiter 38, which has an input/output connection with DMA control ADD/word count 86. DMA control ADD/word count 86 has output connections to programmable AS generation timer 74, address modifier bus generation 88, address register 96, local address bus 44, and optional message buffer 78. DMA control ADD/word count 86 has an input connection extending from local data bus 42. Local data bus 42 has an input connection to data register 92 (or alternatively to optional message buffer 78 which in turn has an output connection to data register 92) and to address register 96. Address register 96, data register 92 and address modifier bus generation 88 have output connections to VME address bus 98, VME data bus 94 and VME address modifier bus 28, respectively. Programmable AS generation timer 74 has an output connection to VME address strobe (AS) line 30.

FIG. 4 is the preferred module for transmitting a broadcast message from the local device over VME bus 22. The broadcast message need not be buffered because VME interface hardware 72 controls the message broadcast cycle time via programmable AS generation timer 74. Likewise, the VME bus master can throttle the transfer speed by controlling when address strobe signals are asserted via VME address strobe line 30. It is likely, however, that buffering the entire message will result in better utilization of VME bus 22, because the transfer speed will not be limited to the bandwidth of local interface 24 (i.e. all the data is read from local interface 22, at a frequency within local interface 22's bandwidth, into optional message buffer 78 before VME bus mastership is granted to the transmitting device. After mastership is granted, data is read from optional message buffer 78 to VME bus 22. The local device is not involved in this second step and therefore does not effect the transfer speed).

VME interface hardware 72 interfaces VME bus 22 to local interface 24 to allow for message broadcast transmittal. Local bus arbitration control 80 sends a local bus mastership request signal (BUS REQUEST) to local bus arbiter 38. Local bus arbitration lines 82 and 84 may simply transmit two signals, BUS REQUEST and BUS GRANT. BUS REQUEST informs the local device that VME interface hardware 72 desires mastership of local data bus 42 and local address bus 44. Local bus arbiter 38 then sends a bus mastership grant signal (BUS GRANT) to local bus arbitration control 80. BUS GRANT informs VME interface hardware 72 that it has been given local bus mastership.

DMA control ADD/word count 86 contains logic used to determine what address of local store 56 will start sending its data to VME bus 22, and the number of words of data to be sent.

Optional message buffer 78 can be used to fully buffer the message before it is sent across VME bus 22.

Programmable AS generation timer 74 is used to control the frequency at which VME address strobe line 30 is driven from high to low. Therefore it controls the frequency at which the message broadcast occurs, by signalling VME bus 22 when it can read VME data and address buses 94 and 98.

If optional message buffer 78 is omitted, programmable AS generation timer 74 throttles VME interface 22's speed, to match the speed of local interface 24. Programmable AS generation timer 74 need not be programmable, but can be fixed to a frequency that falls within local interface 24's bandwidth. Address modifier bus generation 88 contains logic used to place the address modifier code on VME address modifier bus 28. DATA register 92 places the message data on VME data bus 94. For data bus-only (first method) message broadcasts address register 96 is used to place an address on VME address bus 98. For data bus-plus-address bus (second method) message broadcasts address register 96 is used to place message data on VME address bus 98. This second method provides a further increase in VME bus 22's, effective bandwidth by allowing both bus 94 and bus 98 to transfer data messages.

Transmit Module's Direct Memory Access (DMA) Control ADD/Word Count

Figure 5:
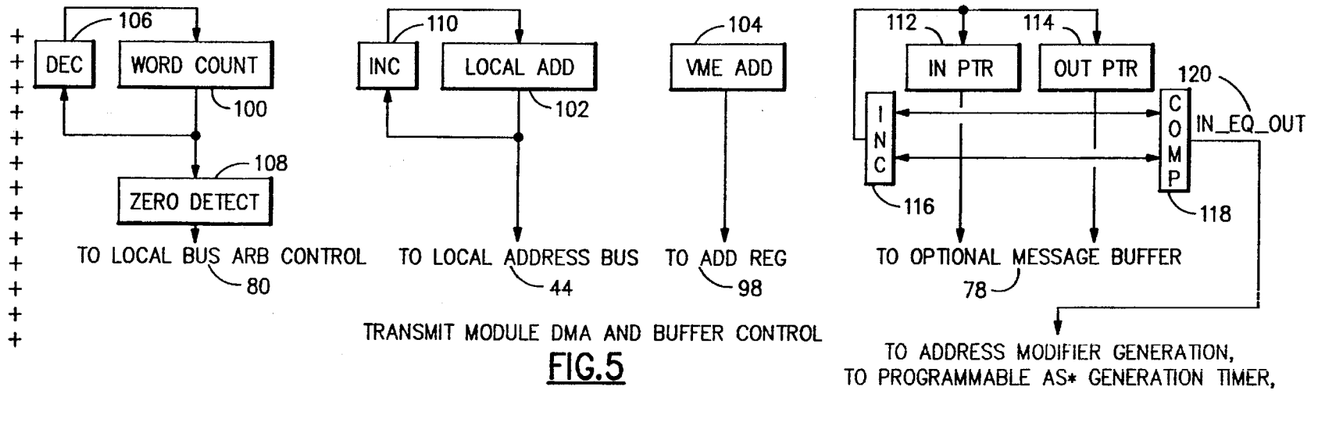
FIG. 5 is a detailed block diagram of the primary components of the direct memory access (DMA) control ADD/ word count of FIG. 4.

FIG. 5 is a detailed block diagram of the primary components of the DMA control ADD/word count 86 of FIG. 4. Word count register 100, local address register 102, and VME address register 104, each have a local bus access path (not shown for clarity) to allow the local device to alter and examine the contents of these registers. Also not shown is a local device read/write transmit enable latch. Once the local device has programmed word count register 100, local address register 102, and VME address register 104 (first method), it sets the transmit enable latch to initiate a message broadcast operation. The transmit enable latch is reset by hardware when the broadcast is complete. Word count register 100 is initially programmed with the total number of words (or bytes depending on the implementation) in the message to be broadcast. Each time a word is fetched from local data bus 42 (of FIG. 4) and stored in optional message buffer 78, word count register 100 is decremented via decrementer 106. Once zero detect logic 108 indicates the word count is zero, control of local data bus 42 is returned to the local device via local bus arbitration control 80.

Local address register 102 contains the source address of the data to be transmitted on VME bus 22. Local address register 102 is incremented via incrementer 110 each time data is fetched from local data bus 42. Data is fetched from the local address specified by local address register 102 until zero detect logic 108 indicates that all words have been fetched.

VME ADD register 104 is used to hold the VME message designation starting address for first method broadcasts. Once the master has gained ownership of VME bus 22, the contents of the address location specified in local address register 102 are gated to the address location specified in VME address register 104.

Input register (IN PTR) 112 and output register (OUT PTR) 114 are used to address optional message buffer 78. IN PTR 112 and OUT PTR 114 share incrementer 116. At the start of the message broadcast operation both IN PTR 112 and OUT PTR 114 are cleared to zero. IN PTR 112 is incremented each time a word of data is fetched from local data bus 42 and is written into optional message buffer 78 (or into data register 92 depending on the implementation). Once the message is completely read from local bus 42, or simultaneously with the fetching of the message from local bus 42, and once the master has gained VME bus mastership, OUT PTR 114 is used to read the message from optional message buffer 78 into data register 92, and then onto VME data bus 94. OUT PTR 114 is incremented each time a word of data is read from optional message buffer 78. OUT PTR register 114 continues reading the message from optional message buffer 78 until comparator 118 indicates IN PTR 112 is equal to OUT PTR 114 via the assertion of signal IN EQ OUT 120. Signal IN EQ OUT 120, when asserted, informs programmable AS generation timer 74 (of FIG. 4) and address modifier bus generation logic 88 (of FIG. 4) to end the VME broadcast sequence.

First Method—Broadcast Over Data Bus Only

Figure 6:
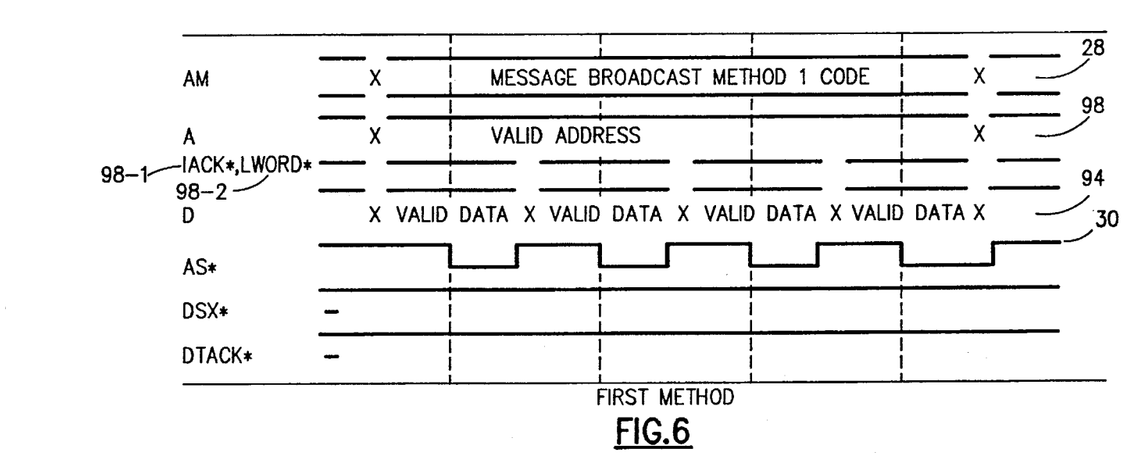
FIG. 6 is a timing diagram of a first method according to this invention for broadcasting multiple byte messages; an address is sent over the address bus and multiple data words are sent over the data bus.

FIG. 6 is a timing diagram of a first method according to this invention for broadcasting multiple byte messages. In this first method, the broadcast message is transmitted only over the data portion of the VME bus. The local device will program DMA control ADD/word count 86 (of FIG. 4) with a local store starting address, word count, and VME target address. When DMA control ADD/word count (DMA control) 86 has been enabled (by register write from the local interface to a transmit enable bit) DMA control 86 will begin the transfer and generate an AS for every word fetched from local store.

VME address modifier bus (AM) 28 carries the code which signals whether the present broadcast cycle will use the first or second method broadcast. In this figure, VME address modifier bus (AM) 28 carries first method broadcast code. The X's shown on the bus lines represent a deskew period during which the data should not be read.

VME address bus (A) 98 carries the starting address in the receiving local store 56 to which the data will be written. LWORD 98-2 is part of address bus 98. VME data bus (D) 94, carries the data message. In this figure, four (4) data words are sent via VME data bus 94. This can be determined by counting the number of falling edges of address strobe line (AS) 30 shown. VME address strobe line (AS) 30 signals a receiving device to read VME address bus 98, VME data bus 94 and VME address modifier bus 28. Buses 98, 94 and 28 are read each time address strobe line 30 falls from high to low, indicated by the dashed lines. Address strobe is asserted (VME address strobe line 30, falls from high to low) at regular intervals, thus providing synchronous broadcasting of both data and address and address messages. This is unlike the prior art of FIG. 1.

Second Method—Broadcast Over Beth Data and Address Buses

Figure 7:
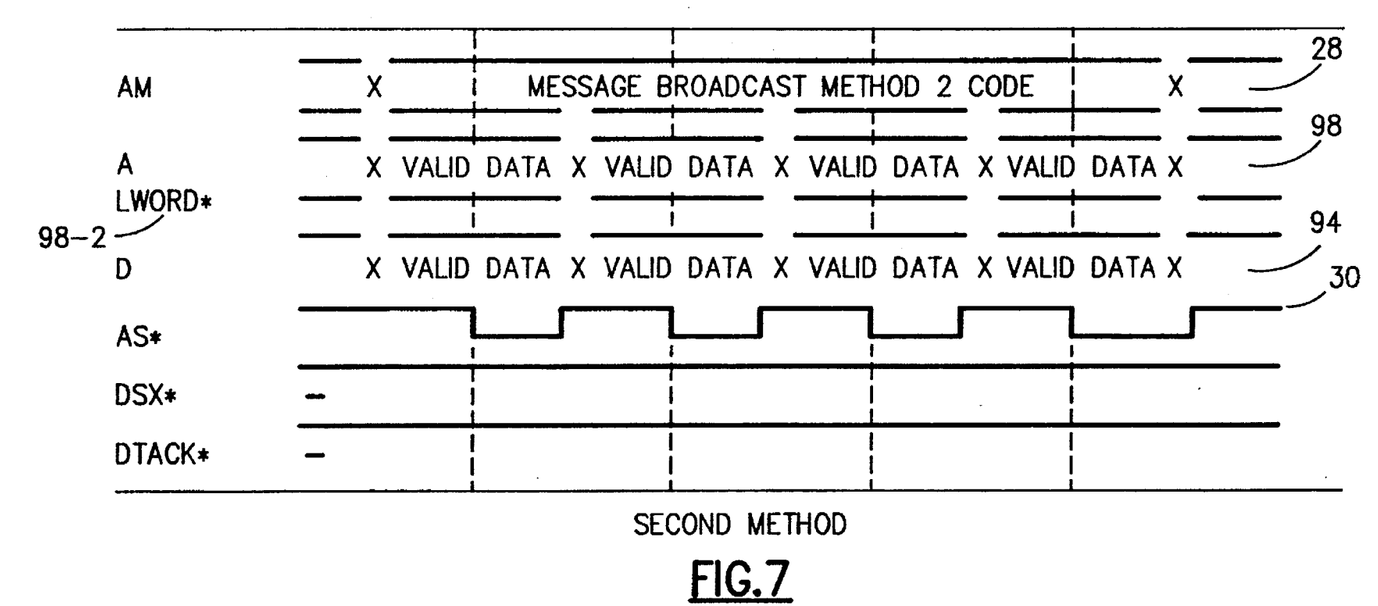
FIG. 7 is a timing diagram of a second method according to this invention for broadcasting multiple byte messages; multiple data words are sent over both the data and the address buses.

FIG. 7 is a timing diagram of a second method according to this invention for broadcasting multiple byte messages, in which data is broadcast over both VME data bus 94 and VME address bus 98. During this second method, local interface 24 (of FIGS. 2 and 4) provides the local store starting address to be used when transferring the data between message buffer 52 (or optional message buffer 78 for transmit operations) and local store 56, although this is not a requirement. Alternatively, a starting local store address may be passed over VME bus 22 using an address only cycle and a new address modifier (AM) bus code indicating that the data on VME address bus 28 is the local store starting address for the data cycle which will follow. In this preferred embodiment interface 24 will either provide a local store starting address or read the data directly to or from message buffer 52 or optional message buffer 78.

In FIG. 7, VME address modifier bus (AM) 28 carries the code which signals whether the present broadcast cycle will use first or second method broadcasting. In this figure, VME address modifier bus (A) 28 carries second method broadcast code. The X's shown on the bus lines represent a deskew period during which the data should not be read.

VME address bus (A) 98 carries a data message (rather than an address location as in the first method). LWORD 98-2 is part of VME address bus 98. VME data bus (D) 94 carries a data message. In this figure, four (4) data words are sent via VME data bus 94, and four (4) data words are sent via VME address bus 98. This can be determined by counting the number of falling edges of address strobe line (AS) 30 (shown by the dashed lines). VME address strobe line (AS) 30 signals a receiving device to read VME address bus 98, VME data bus 94, VME address modifier bus 28 and LWORD 98-2. Buses 28, 94, and 98 (including LWORD 98-2) are read each time VME address strobe line 30, falls from high to low, indicated by the dashed lines. Address strobe is asserted (VME address strobe line 30, falls from high to low) at regular intervals, thus providing synchronous broadcasting of both data and address messages. This is unlike the prior art of FIG. 1.

For this second method, both VME address bus (A) 28 and VME data bus (D) 94 of VME bus 22 are used for message data transmission. The transfer progresses similar to data-bus-only (first) method, except address strobe (AS) is asserted (VME address strobe line (AS) 30 is driven from high to low) only after both registers, data 92 and address 96, have been loaded. This is one method in which outgoing message buffering may be desirable because both registers data 92, and address 96 can be loaded simultaneously and full VME bus bandwidth can be utilized. One further benefit for full outgoing message buffering is the ability to detect bad parity from local store 56 prior to starting arbitration for VME bus 22. This allows the local device to perform a retry and also prevents the corruption of multiple VME bus units with the broadcast of bad data parity over VME bus 22.

A first complementary embodiment of this invention comprises a data processing system including a general purpose digital computer programmed to execute the method of the invention. Such a computer is a well known article of commerce, such as the model 3090 mainframe computer of the International Business Machines Corporation (IBM) or the PS/2 personal computer of IBM, and is not described further.

A second complementary embodiment comprises an article of manufacture for distributing a computer program for performing the method of this invention. Such an article comprises a recording medium upon which are recorded the computer instructions for performing the steps of the method of the invention. The medium is preferably a magnetic tape such as the Model 3480 tape cartridge or IBM, or a removable magnetic disk such as a 3½ inch for use in a PS/2 personal computer. The instructions are recorded on the medium by conventional bulk-recording techniques and devices which are well known in the art, and which are not described further.

Alternative Embodiments

It will be appreciated that, although specific embodiments of the invention have been described herein for purposes of illustration, various modifications may be made without departing from the spirit and scope of the invention.

In the previous figures the additional hardware required for broadcast receives or transmits has been shown separately. It is envisioned that most bus units will contain both transmit and receive hardware, however, they have been shown separately to emphasize the fact that not all bus units need to be capable of both the receive and the transmit functions. Either or both functions may be included depending on the specific use for which the VME bus is desired.

Certainly variations of method 1 and 2 can be created for VME bus systems having 16, 24, 32 bit wide address bus and/or 8, 16, 32 bit wide data bus combinations. FIGS. 2 and 4 depict the preferred embodiments of VME bus device components which can be used for both data-only (first method) and data-plus-address (second method) broadcasts. In these methods a device that is sending the message is considered a master, and an other device or devices that receive the message(s) is considered a slave. Likewise, the words broadcast and synchronous are intended to have their common computer system related definitions; broadcast—to transmit information to several devices; synchronous—two or more processes depending upon the occurrence of specific events, or occurring with a regular relationship.

The components shown and described herein emphasize the additional hardware required to participate in message broadcasts. Implementation of the basic VME bus functions is well known in the art and therefore is not described further. In addition it is assumed that the local interface interfaces a system, micro processor or other device which is capable of performing DMA reads and writes to the message buffer or other hardware for data receipt and transmission over the VME bus. However DMA is not a requirement. Accordingly, the scope of protection of this invention is limited only by the following claims and their equivalents.

We claim:

1. A system for digital communications comprising:

a VME bus including at least a first bus portion and a second bus portion;

a first device attached to at least the first bus portion and the second bus portion and comprising
means for requesting control of the bus,
means for sending clock pulses via said bus;
means for sending via the second bus portion an identifier for a broadcast,
means for sequentially sending data words via the first bus portion synchronously with said clock pulses without receiving an acknowledgment from any recipient from a time of said first device requesting said control until completion of said broadcast; and second and third devices attached to said bus, each of said second and third devices comprising
means for receiving the broadcast identifier via the second bus portion, and
receiving means, responsive to the broadcast identifier, for receiving said data words via the first bus portion synchronously with said clock pulses without replying with an acknowledgment from a time of said first device requesting said control until completion of said broadcast, said second and third devices simultaneously receiving said data words.

2. The system of claim 1, wherein bus;

the first bus portion is a data bus portion, and the second bus portion is an address modifier bus portion; and the broadcast identifier is an address modifier code.

3. The system of claim 1, wherein the bus further includes a third bus portion;

the first device is further attached to the third bus portion and further includes means for sending via the third bus portion a storage address synchronously with said clock pulses; and each of the second and third devices further includes means for receiving the storage address via the third bus portion synchronously with said clock pulses.

4. A device for digital communication via a VME bus, said bus comprising at least a first bus portion and a second bus portion, the device comprising:

means for requesting control of the bus; and responsive to said control, means for sending clock pulses via said bus;

means for sending an indicator for a broadcast via the second bus portion to cause a plurality of other devices attached to the bus to simultaneously receive a sequence of data words via the first bus portion synchronously with said clock pulses and not reply with an acknowledgment from a time of the first said device requesting said control until completion of said broadcast; and means for sending said data words via the first bus portion synchronously with said clock pulses without requiring an acknowledgment signal from any of said other devices from a time of said first device requesting said control until completion of said broadcast.

5. The device of claim 4, wherein the first bus portion is a data bus portion, and the second bus portion is an address modifier bus portion; and the broadcast identifier is an address modifier code.

6. The device of claim 4, wherein the bus further comprises a third bus portion; and the device further includes means for sending a storage address via the third bus portion, the storage address being received by the other devices synchronously with said clock pulses.

7. A system for digital communication comprising:

first, second and third processors; and a VME bus interconnecting said first, second and third processors to each other; and wherein said first processor includes means for requesting control of said bus, and then presenting data words and a code to select said second processor but not said third processor to receive said data words asynchronously, and subsequently requesting control of said bus and presenting a sequence of other data words, clock pulses and another code for indicating a broadcast to cause both said second and third processors to simultaneously receive said other data words synchronously with said clock pulses; and wherein said second and third processors receive said other data words without replying to said first processor with an acknowledgement from a time of said first processor subsequently requesting said control until completion of said broadcast.

8. A system as set forth in claim 7 wherein both of said codes are Address Modifiers of a VME protocol.

9. A system as set forth in claim 7 wherein:

said second processor responds to the first said code by receiving the first said data words asynchronously according to a clock within said second processor and replying with an acknowledgement to said first processor from a time of said first processor subsequently requesting said control until completion of said broadcast; and said second processor responds to said other code by receiving said other data words synchronously with said clock pulses provided by said first processor and does not reply with an acknowledgement to said first processor between receipt of successive data words.

10. A system as set forth in claim 9 wherein both of said codes are Address Modifiers of a VME protocol.

11. A system as set forth in claim 9 wherein:

said third processor determines that said first code does not apply to said third processor and therefore does not receive said first data words; and said third processor responds to said other code by receiving said other data words synchronously with said clock pulses provided by said first processor and does not reply with an acknowledgement to said first processor from a time of said first processor subsequently requesting said control until completion of said broadcast.

12. A system as set forth in claim 7 wherein said second processor includes means for requesting control of said bus, and then presenting a sequence of third data words and a code to select said first processor but not said third processor to receive said third data words asynchronously, and said first processor responds to said code provided by said second processor by receiving said third data words asynchronously, according to a clock within said first processor and replying with an acknowledgement to said second processor between receipt of successive third data words.

13. A system for digital communication comprising;

first, second and third processors;

a VME bust interconnecting said first, second and third processors; and wherein said first processor includes means for requesting control of said bus, and then presenting clock pulses, a sequence of data words synchronously with said clock pulses, and an Address Modifier code indicating a broadcast mode to said bus to cause both said second and third processors to simultaneously receive said data words synchronously with said clock pulses; and wherein said second and third processors receive said data words without replying o said first processor from a time of said first processor requesting said control until completion of said broadcast.

14. A system as set forth in claim 13 wherein said second processor includes means for obtaining control of said bus, and then presenting other clock pulses, other data words synchronously with said other clock pulses, and an Address Modifier code indicating a broadcast mode to cause both said first and third processors to receive said other data words synchronously with said other clock pulses.

15. A system as set forth in claim 13 wherein said second processor includes means for requesting control of said bus, and then simultaneously presenting other data words and a code to select said first processor but not said third processor to receive said data asynchronously according to a clock within said first processor.

16. A system as set forth in claim 15 wherein said first processor responds to the said code provided by said second processor by receiving said first data asynchronously according to a clock within said first processor and replying with an acknowledgement to said second processor between receipt of successive data words.

* * * * *